US 6,669,462 B1

(12) United States Patent
Jenko

(10) Patent No.: US 6,669,462 B1
(45) Date of Patent: Dec. 30, 2003

(54) HOT RUNNER SEALING APPARATUS

(75) Inventor: Edward Jenko, Essex Junction, VT (US)

(73) Assignee: Husk, Injection Molding Systems Ltd., Bolton (CA)

( * ) Notice: Subject to any disclaimer, the term of this patent is extended or adjusted under 35 U.S.C. 154(b) by 0 days.

(21) Appl. No.: 09/575,353

(22) Filed: May 19, 2000

(51) Int. Cl.$^7$ .............................................. B29C 45/20
(52) U.S. Cl. ............... 425/549; 264/328.8; 264/328.15; 425/564
(58) Field of Search ................... 425/549, 572, 425/588, 564; 264/328.8, 328.15

(56) References Cited

U.S. PATENT DOCUMENTS

| 3,023,458 A | 3/1962 | Seymour |
| 3,024,498 A | 3/1962 | Bronnenkant et al. |
| 3,252,184 A | 5/1966 | Ninneman |
| 3,716,318 A | 2/1973 | Erik |
| 3,812,228 A | 5/1974 | Skoroszewski ............... 264/54 |
| 3,849,048 A | 11/1974 | Bielfeldt |
| 4,588,367 A | 5/1986 | Schad |
| 5,178,815 A | 1/1993 | Yokote |
| 5,374,182 A | 12/1994 | Gessner |
| 5,478,230 A | 12/1995 | McGrevy |
| 5,507,637 A | 4/1996 | Schad |
| 5,896,640 A | 4/1999 | Lazinski |

FOREIGN PATENT DOCUMENTS

EP 0 590 678 A 4/1994 ........... B29C/45/28

OTHER PUBLICATIONS

Kunststoffe 69 (1979) 11 "Angussloses Spritzgiessen mit Heisskanalsystemen", p. 780, Figure 14, partial english translation included.
Kunststoffe 75 (1985) 9, pp 542–549 "Development and Design of Injection Moulds" p. 543, Figure 1, english translation included.

Primary Examiner—Tim Heitbrink

(57) ABSTRACT

An apparatus for injecting plastic material comprises a manifold having a melt channel and a flat sealing surface, and a nozzle assembly seated directly against the flat sealing surface. The nozzle assembly includes a nozzle body having an axial channel aligned, in use, with the melt channel in the manifold for communicating a flow of material therein. The nozzle body has a non-flat sealing surface adjacent the flat sealing surface, thereby forming a sealing interface to seal the nozzle body with the manifold. The flat sealing surface may be on an end of a bushing mounted into the manifold. The non-flat surface may have a conical profile, preferably defined by an angle less than one degree, and preferably between 0.2 to 0.4 degrees, from a plane parallel to the flat sealing surface. The non-flat surface may have a spherical profile, preferably having a radius between 350 mm and 4000 mm.

15 Claims, 4 Drawing Sheets

HOT RUNNER SEALING APPARATUS

BACKGROUND OF THE INVENTION

The present invention relates to an improved sealing apparatus and method. More specifically, the present invention relates to an apparatus and method for sealing the interface between two channels located in communication with each other in an injection mold, thereby transporting high pressure, heated molten resin towards mold cavities in a cycling operation without leakage.

Avoiding leakage of the hot and pressurized molten resin material represents a major challenge when designing an injection molding machine or an injection mold. For example, a critical leakage area in an injection molding machine is between the machine's injection nozzle and the mold's sprue bushing. Leakage commonly appears in an injection molding machine between the manifold and the mold nozzles or at the interface between the mold nozzle and the mold cavity.

Injection molding manifolds are usually made of a massive runner block communicating with the injection nozzles located adjacent the mold cavities. Leakage of the molten resin material at the interface of the runner block and the injection nozzle, for example, represents a major problem due to the high pressure of the heated, flowing molten resin and the relative differential thermal expansion of the materials which makes the runner block slide laterally with respect to the injection nozzles. Sealing of the fluid interface between the internal channels located in the runner block or manifold and the injection nozzle represents, therefore, a significant design problem, especially taking into account that the injection process must be stopped if leakage occurs.

The prior art teaches several sealing methods and elements that have been developed, but these do not satisfactorily solve the leakage problem especially at the interface between the manifold and the mold nozzle. In addition, the prior art allows large compressive forces to be generated within the injection manifolds, requiring the use of thick steel plates and numerous structural fasteners.

Known design concepts in injection molds use a small pre-load in cold condition between the manifold and the nozzle. This small pre-load accompanies the inherent thermal expansion of the manifold to provide sufficient compression between the parts to maintain sealing between the manifold and nozzle or between other channels in the system during operation. However, while too little compression results in plastic leakage, extreme compression causes either permanent setting of the manifold steel or damage to the nozzle housing. During operation, forces between the manifold and nozzle can be in excess of 10,000–14,000 pounds for each nozzle. These large forces require the use of massive blocks of steel and numerous high-strength fastners within an injection mold machine. In addition to this, the prolonged and cyclic injection molding operation will reduce the effectiveness of the pre-load, thus increasing the likelihood of leakage.

Several improvements to these design concepts have been developed that use different methods and means to prevent leakage of the plastic resin.

U.S. Pat. No. 3,849,048 to Bielfeldt (incorporated herein by reference) shows a hydraulically actuated back-up pad that takes up the cold clearance to prevent leakage. This piston acts like a spring. Inside the housing is a second hydraulic piston which drives the valve stem. The nozzle body is threaded into the manifold insert and therefore thermally expands laterally when the manifold expands. The close proximity of flammable hydraulic oil to the heated manifold means that there is a great risk of fire with this design after the seals have worn.

U.S. Pat. No. 3,716,318 to Erik (incorporated herein by reference) shows a combined nozzle/manifold bushing piece which is inserted through the manifold from the underside and is retained by a threaded back-up pad. This construction is also disadvantageous in that the nozzle assembly must travel laterally with the manifold as it thermally expands.

U.S. Pat. No. 3,252,184 to Ninneman (incorporated herein by reference) shows a manifold bushing piece inserted through the manifold and butted against the spigotted end of the nozzle body. Because the nozzle body is spigotted to the manifold, it must travel laterally when the manifold thermally expands.

U.S. Pat. No. 3,023,458 to Seymour (incorporated herein by reference) illustrates a one piece manifold bushing and nozzle body inserted through the manifold. The valve stem is closed with a spring and opened via injection pressure. The nozzle end of the bushing appears to be located in a recess in the mold cavity plate and clearly cannot accommodate lateral thermal expansion of the manifold plate with respect to the cavity plate. In effect, bending occurs which would tend to cause the valve stem to bind.

U.S. Pat. No. 5,896,640 to Lazinski, et al. (incorporated herein by reference) teaches an annular shaped thermal expansion element to provide improved sealing at the interface between the manifold and the nozzle body. This annular shaped element comprises an angular, spring-like radial surface that interfaces with the underside of the nozzle body shoulder, thereby enhancing the sealing pressure profile at the mating surfaces. This apparatus, while providing an improved pressure profile for sealing adjacent the channel, still produces large compressive forces that require the use of large manifold structures.

U.S. Pat. No. 4,588,367 to Schad (incorporated herein by reference) teaches a thermal expansion element to seal the flow of resin through the interface between the manifold channel and injection nozzle, or a thermal expansion element with an undercut to give it additional elastic sealing properties, or a thermal expansion element with a spring element to enhance the sealing properties by adding an elastic feature. The thermal expansion element allows relative movement between the manifold, thermal expansion element and nozzle.

U.S. Pat. No. 5,374,182 to Gessner (incorporated herein by reference) uses a spring which deflects as the nozzle body and the air back-up pad expand due to the increase in temperature. The sealing device uses Belleville style disc springs assembled on an insulating sleeve. As the manifold heats up the disc spring package absorbs the thermal expansion and prevents over-stressing the nozzle housing or setting of the manifold's plate steel. This design provides a superior anti-leaking solution in many situations where the injection pressure remains relatively small. The disc spring system of the '182 patent loads the flange of the nozzle housing in a purely axial direction perpendicular to the interface surface between the nozzle and the manifold plate. By providing an axial sealing force, the profile of the sealing stress shows a significant decrease towards the melt channel relative to the peak achieved at the point of contact between the spring and the nozzle. In the event that the injection pressure reaches higher valves this improved design does not effectively prevent leakage of the molten plastic resin outside the passageway.

U.S. Pat. No. 5,507,637 to Schad et al. (incorporated herein by reference) teaches a sealing clamp ring attached to the manifold and surrounding the nozzle housing that prevents leakage of the resin at the interface between the manifold and the nozzle. A certain lateral clearance that remains between the clamp ring and the nozzle allows the manifold and the clamp ring to slide laterally without affecting the alignment of the nozzle tip with respect the mold gate.

The design concepts of the cited patents represent a significant advance and use a sliding interface between the manifold and the nozzle housing. As the manifold heats and expands it also slides across the nozzle housings which are held in the cavity plate counter bores. This allows the nozzle tip location to be maintained in proper alignment with the mold gate, independent of the temperature of the manifold. However, in a sliding interface between the nozzle and the manifold it is difficult to fully seal the interface between the channels of the two parts using the sealing means disclosed in these references and one cannot easily achieve a sealing stress distribution which has its peak adjacent the channels. In addition, all of these prior art examples rely on the use of high forces, generated by their spring(s) or spring-like structure to ensure the interface sealing is effective over a wide range of temperatures, thereby eliminating the risk of leakage at the interface. These large forces mean the structure of the mold and the manifold must be designed to handle loads between 10,000–14,000 lbs per nozzle.

SUMMARY OF THE INVENTION

An apparatus of the present invention for injecting plastic material comprises a manifold having a melt channel and a flat sealing surface, and a nozzle assembly seated directly against the flat sealing surface. The nozzle assembly includes a nozzle body having an axial channel aligned, in use, with the melt channel in the manifold for communicating a flow of material therein. The nozzle body has a non-flat sealing surface adjacent the flat sealing surface, thereby forming a sealing interface to seal the nozzle body with the manifold. The flat sealing surface may be on an end of a bushing mounted into the manifold. The non-flat surface may have a conical profile, preferably defined by an angle less than one degree, and preferably between 0.2 to 0.4 degrees, from a plane parallel to the flat sealing surface. The non-flat surface may have a spherical profile, preferably having a radius between 350 mm and 4000 mm.

The apparatus may also include a compressive force regulator for limiting compressive forces adjacent the melt channel and the axial channel interface. In one embodiment, the compressive force regulator may be a flexible flange on the nozzle body, and the flexible flange may have an annular step that includes a surface for engaging a surface of the manifold to limit movement of the flexible flange. The non-flat surface is preferably on the flexible flange and extends from the axial channel to the annular step.

BRIEF DESCRIPTION OF THE DRAWINGS

The present invention will be more readily understandable from the following illustrative drawings, wherein.

Numerals Used In Figures.

100—a preferred embodiment
102—backing plate
104—manifold plate
107—bolt
108—nozzle assembly
110—manifold/bushing arrangement
112—nozzle body
113—nozzle insulator
114≦tip
116—nozzle heater
118—spring means
120—axial channel
122—sheath
124—cable
126—valve stem
128—gate
129—passageway
130—bushing
131—piston head
132—set screw
133—first end wall
134—second end wall
135—cylinder housing
136—back-up pad
138—manifold
139—manifold heater
140—air gap
142—melt channel
143—bore
144—bushing channel
146—dowel
148—lower portion
150—upper surface
151—non-flat sealing interface
152—central portion
154—upper portion
156—aperture
158—nut
159—seal
160—prior art sealing pressure distribution
161—annular step
162—improved sealing pressure distribution

DETAILED DESCRIPTION

Figure 1:
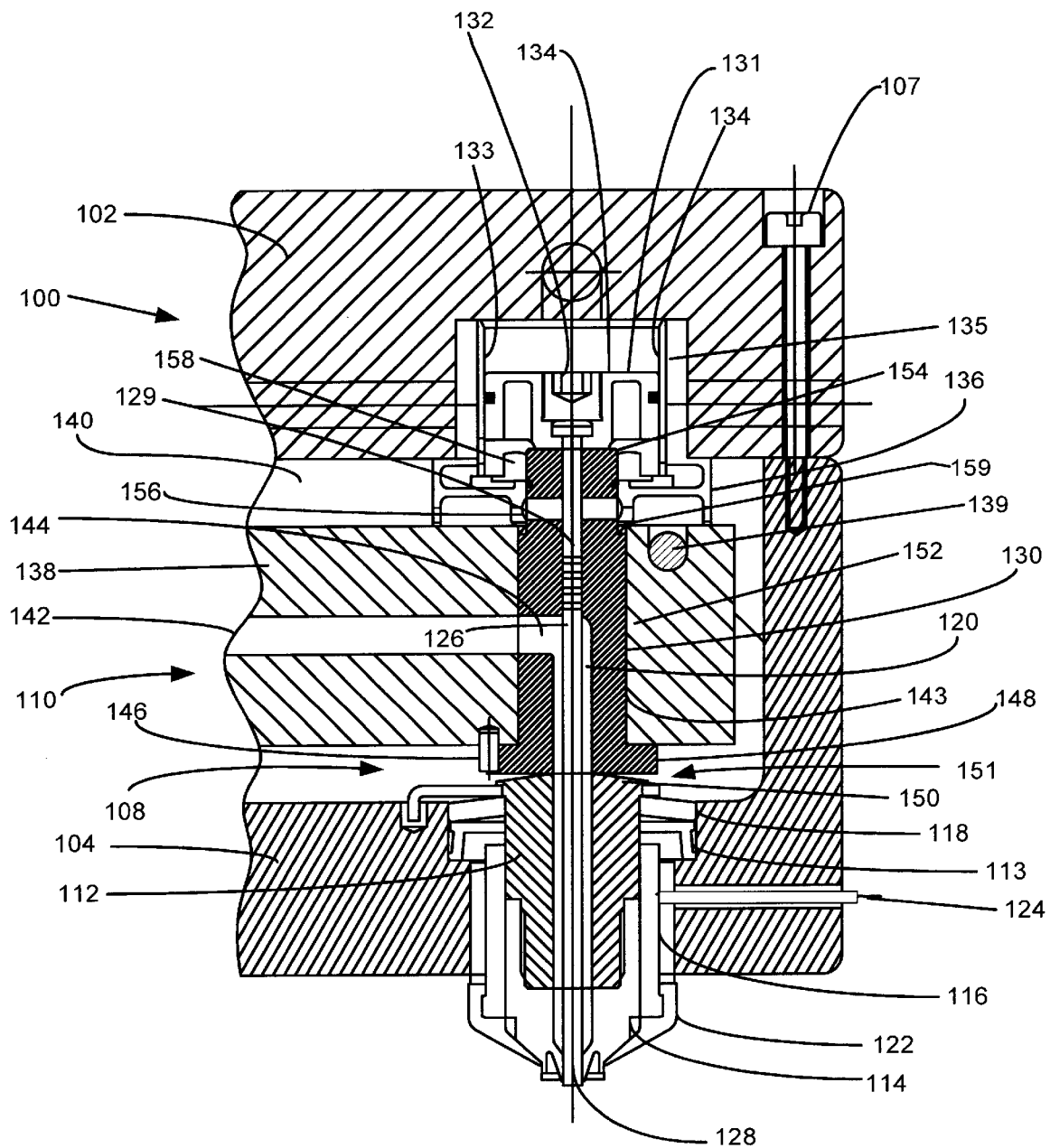
FIG. 1 illustrates a sectional view of a preferred embodiment of the present invention.

Referring now to FIG. 1, a hot runner valve gate system for injecting plastic material 100 into a mold or the like is illustrated. The system includes a backing plate 102 and a manifold plate 104. The system further includes a nozzle assembly 108 for introducing molten plastic material into a mold (not shown) and a manifold/bushing arrangement 110 for allowing communication of plastic material from a source (not shown) to the nozzle assembly 108. A manifold heater 139 is shown inserted in a manifold 138, thereby heating the manifold 138 which in turn heats the flowing plastic within a melt channel 142 and a bushing channel 144.

As shown in FIG. 1, the nozzle assembly 108 consists of a nozzle body 112, a tip 114, a nozzle heater 116, a spring means 118, and a nozzle insulator 113. The purpose of the spring means 118 will be discussed hereinafter. The nozzle body 112 is typically made of steel, while the tip 114 may be formed from any suitable highly heat-conductive material known in the art such as beryllium/copper. The nozzle body 112 has an axial channel 120 through which molten plastic material flows. The tip 114 surrounds a terminal part of the axial channel 120. If desired, the nozzle tip 114 may include a sheath 122 for thermally insulating the downstream end of the nozzle tip 114. The sheath 122 may be formed from a resinous material which may be prefabricated. Alternatively, the sheath 122 may be formed from an overflow of injected resin in the first operating cycle or cycles. The nozzle insulator 113 is installed within a cavity of the manifold plate 104 and acts to reduce the thermal communication between the nozzle body 112 and the manifold plate 104, thereby maintaining the high temperature of the molten plastic material as it flows through the axial channel 120. The nozzle insulator 113 may be formed from any suitable insulating material, typically known in the art such as titanium.

The nozzle heater 116 may be any suitable electric heater known in the art to which current is admitted by way of a cable 124. As shown in FIG. 1, the nozzle heater 116 surrounds a portion of the nozzle body 112.

A valve stem 126 is provided to permit opening and closing of the gate 128 in the nozzle body 112. The valve stem 126 may be formed by a steel rod which extends through a passageway 129 in the bushing 130 and into the nozzle body 112. As can be seen from FIG. 1 the passageway 129 mates with the melt channel 144 in the bushing 130. The end of the valve stem 126 opposite to the gate 128 is connected to a piston head 131 by a set screw 132.

The piston head 131 is housed within a cylinder housing 135 formed by first and second end walls 133 and 134 respectively. Downstroke of the piston head 131 causes the valve stem 126 to move into a position where it closes or reduces the cross sectional area of the gate 128 so as to restrict flow of the molten plastic material. Upstroke of the piston head 131 causes the valve stem 126 to move so as to increase flow of the molten plastic material through the gate 128.

As previously discussed, the valve gate system of the present invention also includes a manifold/bushing arrangement 110 consisting of the manifold 138 and the bushing 130. The manifold 138 is formed by a distribution plate housed between the plates 102 and 104 but separated therefrom by an air gap 140. The backing plate 102 is rigidly affixed to the manifold plate 104 by a plurality of high strength bolts 107 which must withstand the large tensile forces generated during the cyclic molding process. The manifold includes the melt channel 142 forming part of the hot runner system for transporting molten plastic material from a source (not shown) to the gate 128 associated with a respective mold or molds. The manifold further includes a bore 143 into which the bushing 130 is inserted. The manifold 138 may be formed from any suitable metal or heat conducting material known in the art. The manifold heater 139 is well known in the art and typically comprises a wire/ceramic resistive type heater with a cylindrical cross section that is seated into a groove of the manifold 138.

The bushing 130 surrounds a portion of the valve stem 126. The bushing 130 is formed from any suitable material known in the art (usually steel) and is designed to be inserted through the manifold 138 from the underside. As shown in FIG. 1, the bushing channel 144 in the bushing 130 mates with the melt channel 142 in the manifold 138 and the axial channel 120 in the nozzle assembly 108. One or more dowels 146 are provided to facilitate alignment of the manifold 138 and the bushing 130 so that the channels 142 and 144 are in axial alignment with each other.

Figure 2:
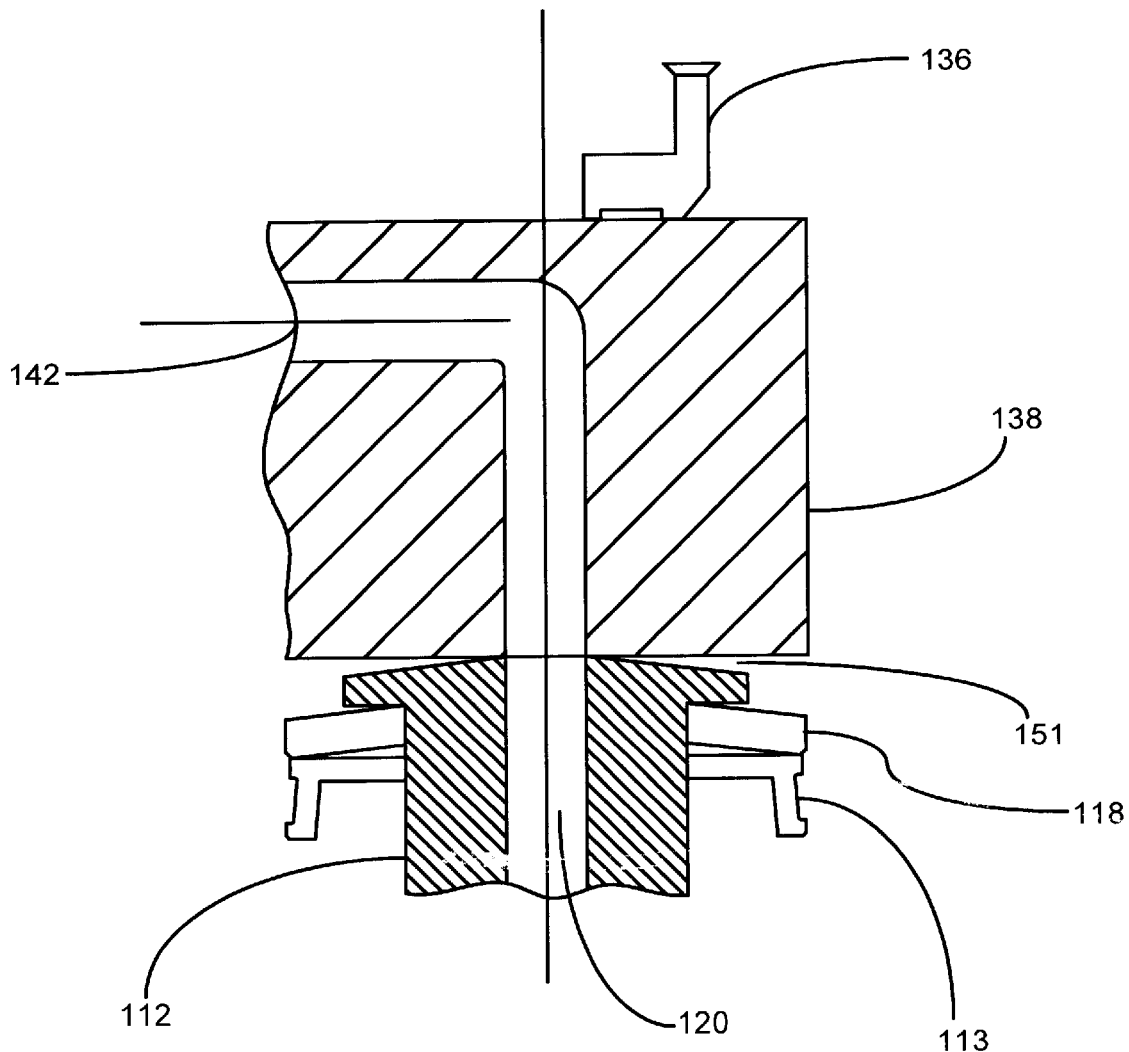
FIG. 2 illustrates an enlarged simplified sectional view of the preferred embodiment in the area of the sealing interface.

The bushing 130 has a lower portion 148 which is located between the underside of the manifold 138 and an upper surface 150 of the nozzle body 112. As shown in FIGS. 1 and 2, the upper surface 150 is non-flat, typically having a conical or spherical profile, thereby creating a non-flat sealing interface 151. This unique structure provides a pressure distribution that concentrates the sealing pressure adjacent the bushing channel 144 and the axial channel 120. This improved pressure distribution allows for reliable plastic sealing at the interface of the nozzle body 112 and the bushing 130. In addition, the more concentrated sealing force allows for a reduction in the compressive forces therein to provide a reliable plastic seal. Reduced compressive forces translates into a reduction in size of the backing plate 102 and the manifold plate 104 as well as a reduction in the size and number of bolts 107.

The bushing 130 further has a central portion 152 which has an outside diameter substantially equal to the diameter of the bore 143 in the manifold 138. Still further, the bushing has an upper portion 154 which is threaded along at least part of its extent.

As shown in FIG. 1, the upper portion 154 of the bushing 130 extends through an aperture 156 in a back-up pad 136. A nut 158 is provided to mechanically join the bushing 130 to the back-up pad 136. The back-up pad 136 acts to reduce the thermal communication between the backing plate 102 and the manifold 138, thereby maintaining the molten resin at an elevated temperature. A seal 159 is provided to further reduce the possibility of leakage of the plastic material up the periphery of bore 143. The seal 159 is typically made from a heat resistant material like steel.

The spring means 118 deflects as the nozzle body 112 and the back-up pad 136 expand due to increases in temperature. In accordance with the present invention, the spring means 118 causes a spring action in the nozzle assembly 108. It should be noted however that any action caused by the springs 118 on the nozzle body 112 is completely independent of any sealing action between the manifold bushing 130 and the manifold 138 and between the manifold bushing 130 and the back-up pad 136.

Now referring to FIG. 2, an enlarged cross-sectional view of the non-flat sealing interface 151 of the bushing 130 to the manifold 138 is shown. In this embodiment, the manifold/bushing arrangement 110 has been removed, and the nozzle body 112 seats against the manifold 138 directly.

Figure 3:
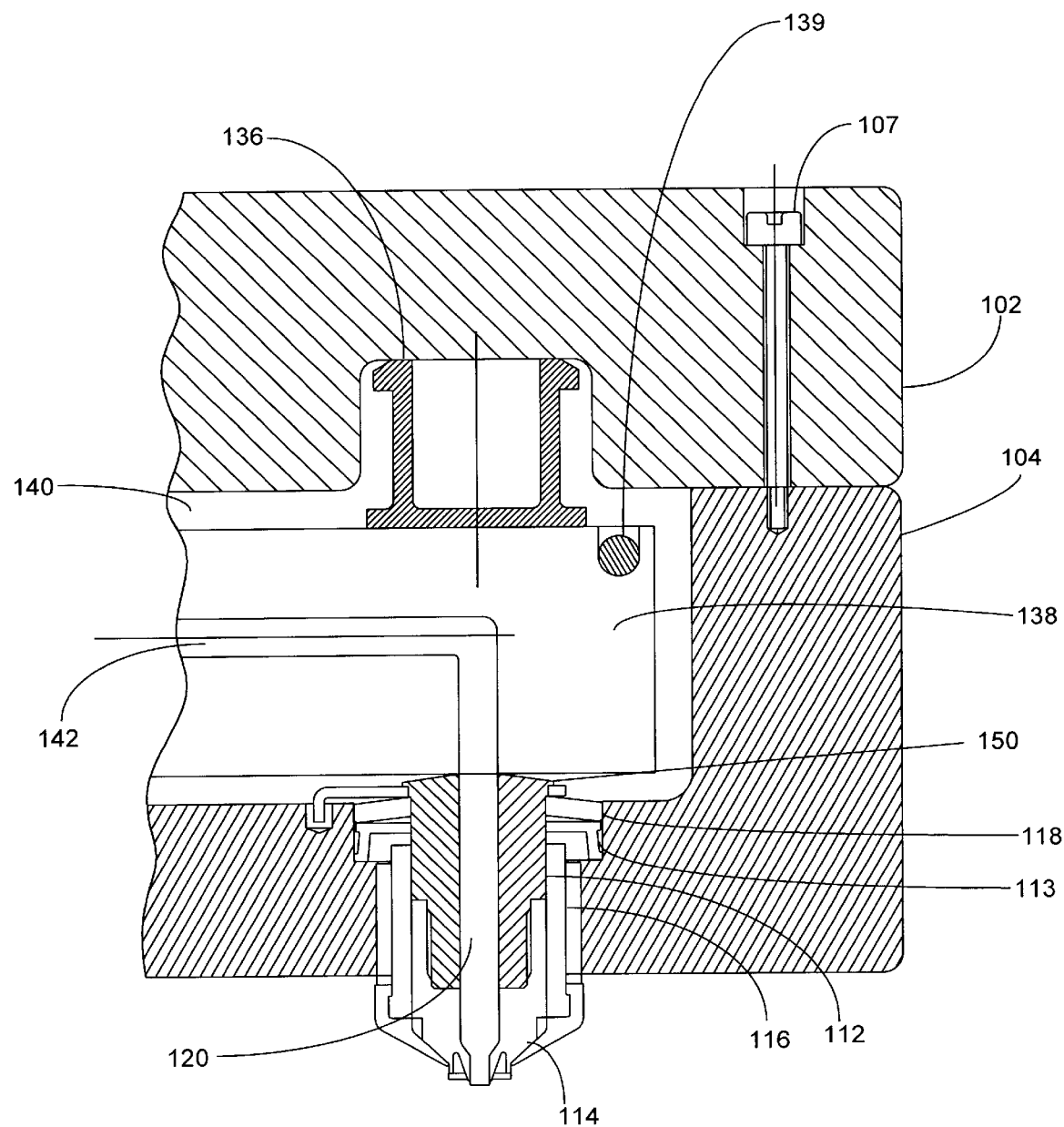
FIG. 3 shows a sectional view of a non-gated version of the preferred embodiment.

Referring now to FIG. 3, a non valve-gated hot runner system for injecting plastic material into a mold or the like is illustrated. This system operates essentially similar to the system shown in FIG. 1, except the mechanism to open and close the gate 128 at the tip 114 has been removed.

The reader will also note that in the non valve-gated system of FIG. 3, the manifold/bushing arrangement 110 as shown in FIG. 1 has also been removed. In this configuration, the upper surface 150 of the nozzle body 112 seats against the manifold 138. directly.

According to the present invention, the upper surface 150 has a non-flat surface such that the interface between the nozzle body 112 and the manifold 138 occurs immediately adjacent the melt channel 142 and axial channel 120. The non-flat surface could be conical, spherical or the like. This unique structural arrangement creates a concentrated sealing pressure that has its peak closest to the point of possible leakage while at the same time, reduces the magnitude of the compressive forces required within the overall system for leakage prevention.

Figure 4:
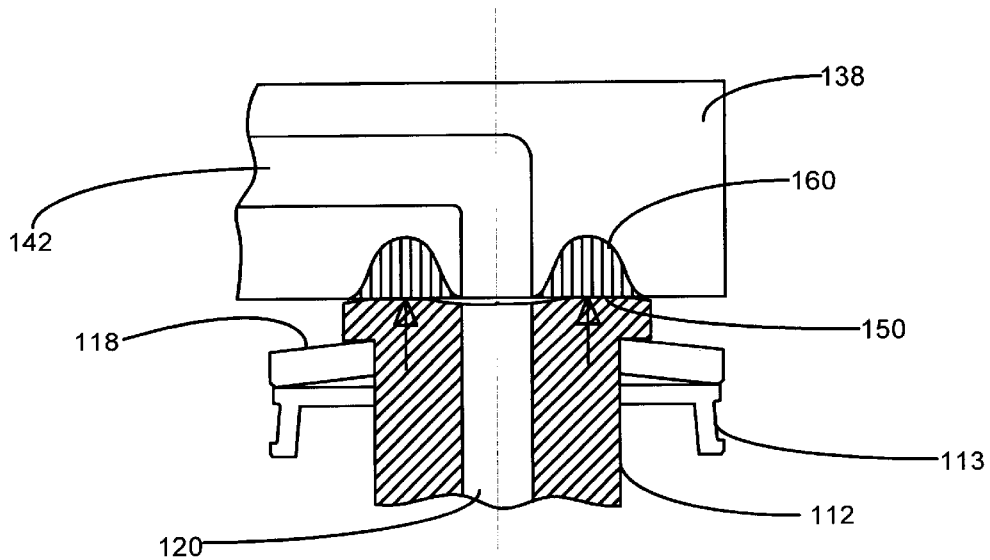
FIG. 4 illustrates a sectional view failure mode of the prior art with a prior art sealing pressure distribution.

Referring to FIG. 4, a typical failure mode of the prior art is shown. A prior art sealing pressure distribution 160 is created when the flat upper surface 150 is forced against the substantially flat surface of the manifold 138. The sealing pressure distribution 160 is lowest adjacent melt channel 142 and axial channel 120. The high pressure of the molten plastic flowing in channels 142 and 120 acts to deform the sealing interface as shown in FIG. 4 due to the reduced sealing pressure at the interface, and leakage of the molten plastic occurs.

Figure 5:
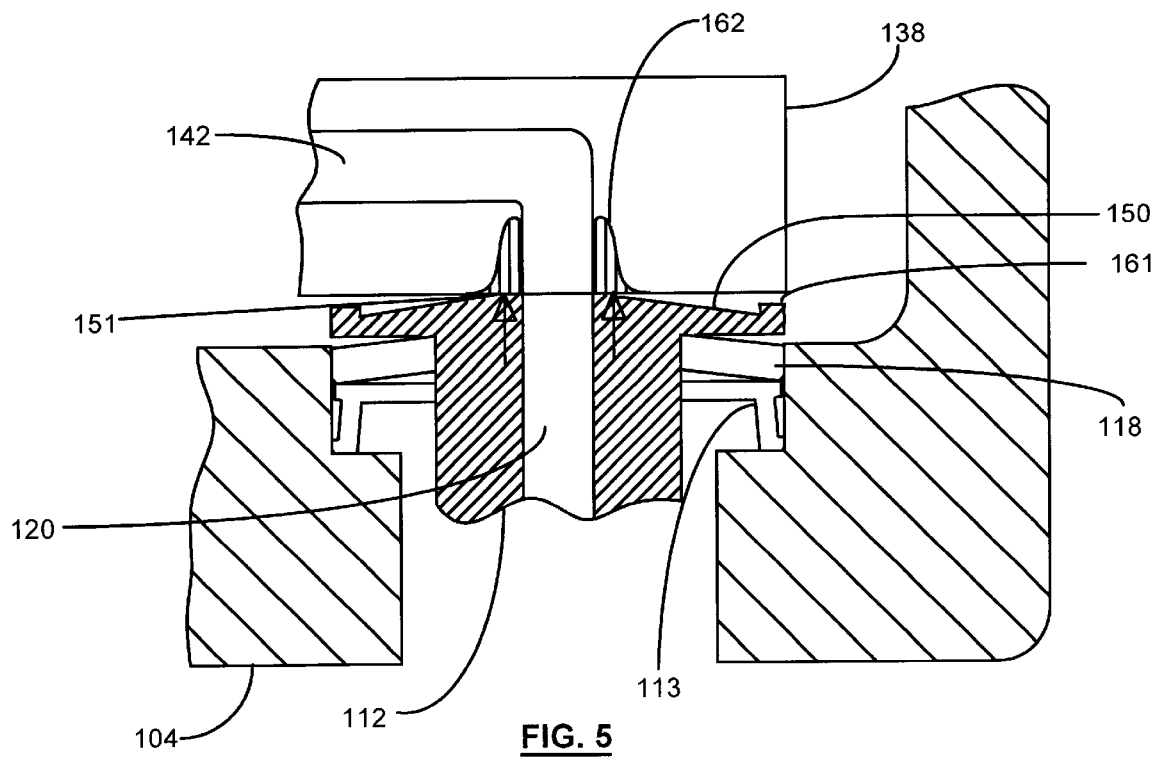
FIG. 5 shows a sectional view of the preferred embodiment with a conical surface and improved sealing pressure distribution.

Now referring to FIG. 5, which generally shows the nozzle body 112 with a conical upper surface 150. This arrangement overcomes the failure mode as shown in FIG. 4 by providing an improved sealing pressure distribution 162 that has its peak sealing pressure adjacent melt channel 142 and axial channel 120. Intimate surface contact in this area seals small imperfections between the mating surfaces thereby reducing the possibility of seal failure as shown in FIG. 4.

Providing a spherical upper surface 150 instead of the conical surface will have the added benefit of distributing the load more gradually as the force is applied, however it will be more costly to produce. Computer modeling and analysis predicts that a conical surface can be prescribed that will closely approximate the ideal spherical radius. It has been determined that a conical angle less than 1° preferably between 0.2° to 0.4° from the horizontal is ideal for melt channels having a diameter between 5–12 mm, with injection pressures between 20,000–28,0000 psi maximum. This optimum angle will increase as injection pressures decrease and the angle will decrease as injection pressure increases. If a spherical shape is desired it may be in the comparable size range of 350–4000 mm radius.

As mentioned previously, due to the concentrated sealing pressure of the present invention, compressive loads within the injection machine will be reduced. As a result, the frictional forces associated with the injection process will be decreased considerably as the various components displace relative to each other. The reduced compressive forces will thereby reduce the potential for localized plate buckling as well as galling and fretting that may occur as the surfaces slide over each other. One skilled in the art could easily design a nozzle housing flange or base with a non-flat interface that could also act as a compressive force regulator by varying the conical angle and the housing flange thickness that would allow flexing in the housing flange itself. Referring to FIG. 5, an annular step 161 could be employed to flex toward the manifold and assume loads past a prescribed calculated value to ensure no excessive forces occur adjacent the melt channel interface.

Naturally, the system of the present invention can be effectively employed in other channel connections in an injection molding apparatus where leakage of the molten resin may be a problem, as for example, in other manifold connections.

It is apparent that there has been provided in accordance with this invention an improved hot runner sealing apparatus and method which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

I claim:

1. An apparatus for injecting plastic material, the apparatus comprising:
   a manifold having a melt channel and a flat sealing surface; and
   a nozzle assembly seated directly against the flat sealing surface, the nozzle assembly including a nozzle body having an axial channel aligned, in use, with the melt channel for communicating a flow of material therein, the nozzle body having a non-flat sealing surface abutting the flat sealing surface, thereby forming a sealing interface to seal the nozzle body with the manifold.

2. The apparatus according to claim 1, further comprising a bushing mounted into the manifold, the bushing having a bushing channel aligned with the melt channel and the axial channel, the flat sealing surface being on an end of the bushing.

3. The apparatus of claim 1, further comprising a spring means operatively maintaining positive pressure between the flat surface and the non-flat surface.

4. The apparatus of claim 3, wherein said spring means is a disc spring.

5. The apparatus according to claim 1, further comprising a valve stem slidably inserted into the axial channel to control the flow of material in use.

6. The apparatus according to claim 5, wherein the valve stem has a first end and a second end, and further comprising a piston rigidly affixed to the first end, the piston selectively positioning the second end to control the flow of material.

7. The apparatus of claim 1, wherein the non-flat surface has a conical profile.

8. The apparatus of claim 7, wherein the conical profile is defined by an angle between 0.2 to 0.4 degrees from a plane parallel to the flat sealing surface.

9. The apparatus of claim 1, wherein the non-flat surface has a spherical profile.

10. The apparatus of claim 1, further comprising a compressive force regulator for limiting compressive forces adjacent the melt channel and the axial channel at the sealing interface.

11. The apparatus of claim 10, wherein the compressive force regulator is a flexible flange on the nozzle body.

12. The apparatus of claim 11, wherein the flexible flange has an annular step that includes a surface for engaging a surface of the manifold to limit movement of the flexible flange.

13. The apparatus of claim 12, wherein the non-flat surface is on the flexible flange and extends from the axial channel to the annular step.

14. The apparatus of claim 7, wherein the conical profile is defined by an angle less than one degree from a plane parallel to the flat sealing surface.

15. The apparatus of claim 9, wherein the spherical profile has a radius from between about 350 mm to about 4000 mm.

* * * * *

UNITED STATES PATENT AND TRADEMARK OFFICE
CERTIFICATE OF CORRECTION

PATENT NO.    : 6,669,462 B1
DATED         : December 20, 2003
INVENTOR(S)   : Jenko, Edward Page 1 of 1

It is certified that error appears in the above-identified patent and that said Letters Patent is hereby corrected as shown below:

<u>Title page,</u>
Item [73], Assignee, reads "Husk," should read -- Husky --

Signed and Sealed this

Twenty-fourth Day of February, 2004

JON W. DUDAS
*Acting Director of the United States Patent and Trademark Office*